O. W. CURTIS.
MILLING MACHINE.
APPLICATION FILED MAR. 9, 1917.

1,242,775.

Patented Oct. 9, 1917.
7 SHEETS—SHEET 1.

WITNESSES:

INVENTOR
Oliver W. Curtis
BY
Harry D. Wallace
ATTORNEY

O. W. CURTIS.
MILLING MACHINE.
APPLICATION FILED MAR. 9, 1917.

1,242,775.

Patented Oct. 9, 1917.
7 SHEETS—SHEET 2.

WITNESSES:
A. C. Thomas

INVENTOR
Oliver W. Curtis
BY
Harry D. Wallace
ATTORNEY

O. W. CURTIS.
MILLING MACHINE.
APPLICATION FILED MAR. 9, 1917.

1,242,775.

Patented Oct. 9, 1917.
7 SHEETS—SHEET 4.

WITNESSES:

INVENTOR
Oliver W. Curtis
BY
ATTORNEY

O. W. CURTIS.
MILLING MACHINE.
APPLICATION FILED MAR. 9, 1917.

1,242,775.

Patented Oct. 9, 1917.
7 SHEETS—SHEET 5.

WITNESSES:

INVENTOR
Oliver W. Curtis
BY
ATTORNEY

O. W. CURTIS.
MILLING MACHINE.
APPLICATION FILED MAR. 9, 1917.
1,242,775.
Patented Oct. 9, 1917.
7 SHEETS—SHEET 6.
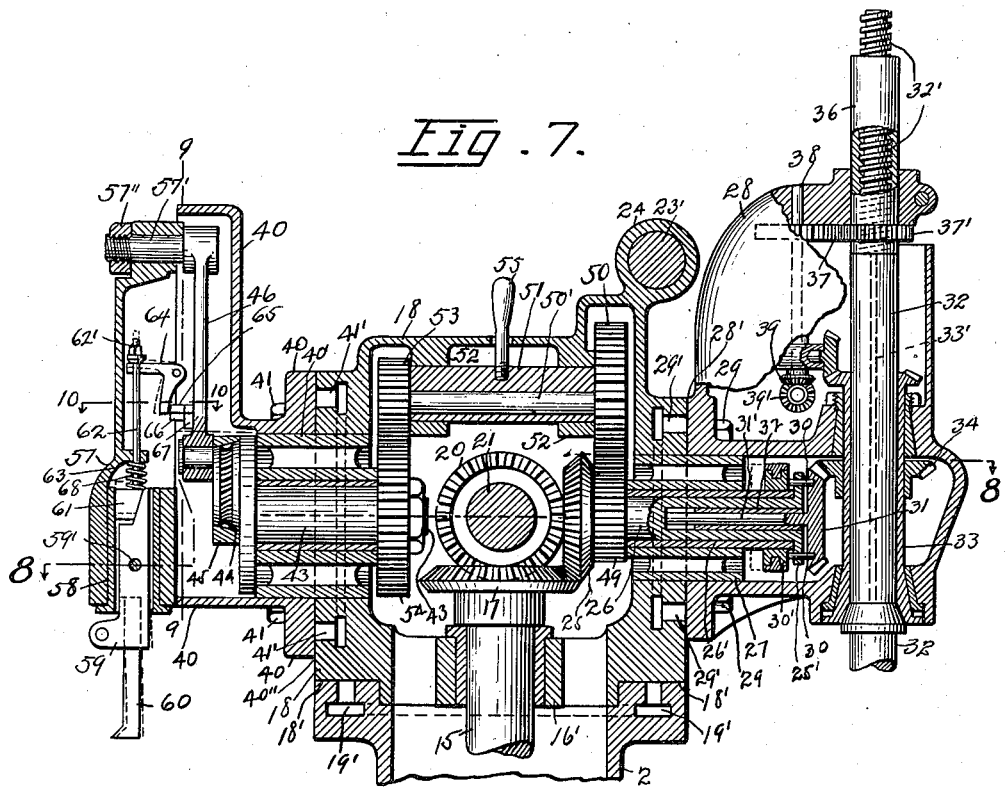
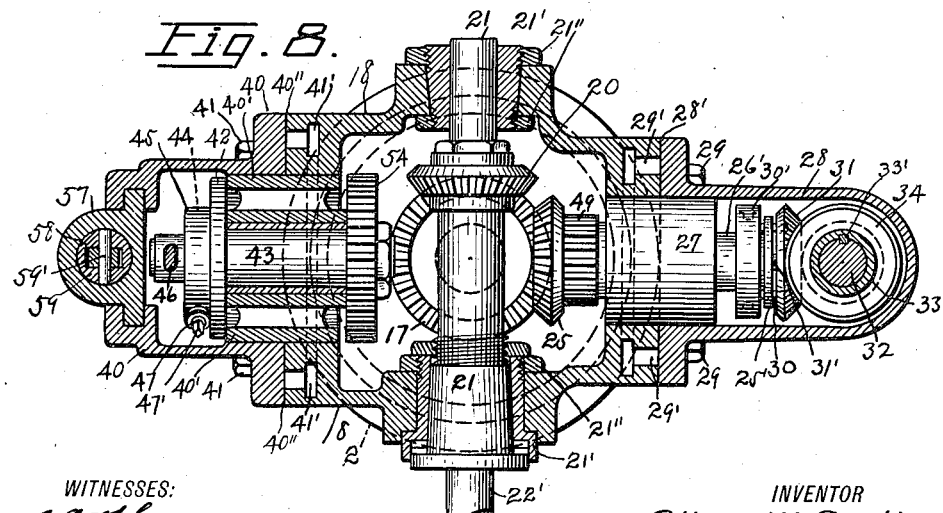
WITNESSES:
INVENTOR
Oliver W. Curtis
BY
Harry D. Wallace
ATTORNEY

O. W. CURTIS.
MILLING MACHINE.
APPLICATION FILED MAR. 9, 1917.

1,242,775.

Patented Oct. 9, 1917.
7 SHEETS—SHEET 7.

WITNESSES:

INVENTOR
Oliver W. Curtis
BY
ATTORNEY

UNITED STATES PATENT OFFICE.

OLIVER W. CURTIS, OF WATERTOWN, NEW YORK.

MILLING-MACHINE.

1,242,775.     Specification of Letters Patent.     Patented Oct. 9, 1917.

Application filed March 9, 1917. Serial No. 153,571.

*To all whom it may concern:*

Be it known that I, OLIVER W. CURTIS, a citizen of the United States, residing at Watertown, in the county of Jefferson and State of New York, have invented certain new and useful Improvements in Milling-Machines, of which the following is a specification.

This invention relates to improvements in milling machines, and has for its object to provide, instead of the usual rigid head, a movable turret or revolving head, which carries a number of tools—such as milling cutters, drills, taps, reamers, slotting and shaping tools—which are brought at will into the operative positions, and wherein several of the different tools are adapted to be operated simultaneously by a common driving means. A further object is to provde indivdual turrets or means for rendering certain of said tools adjustable independent of the main turret. And a further object is generally to improve and extend the scope and kinds of the work done by milling machines.

I attain these objects by the means set forth in the detailed description which follows, and as illustrated by the accompanying drawings, in which—

Figure 1:
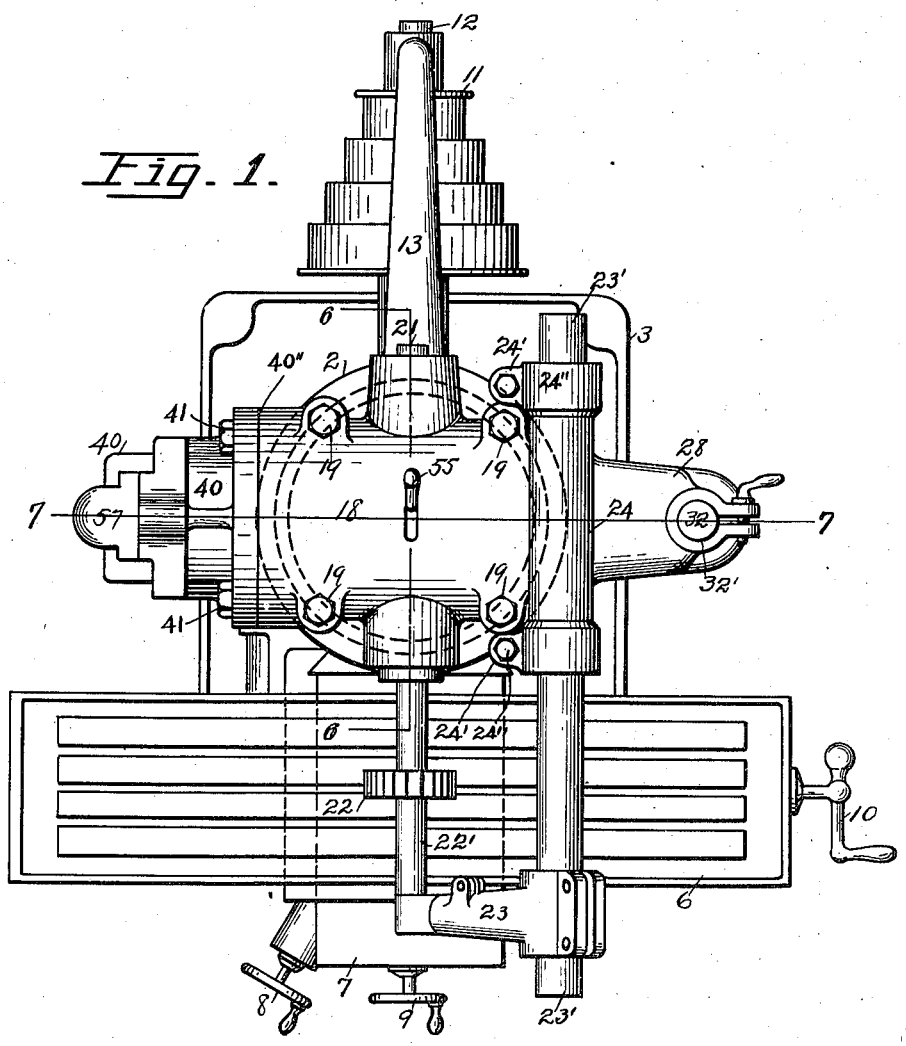
Figure 2:
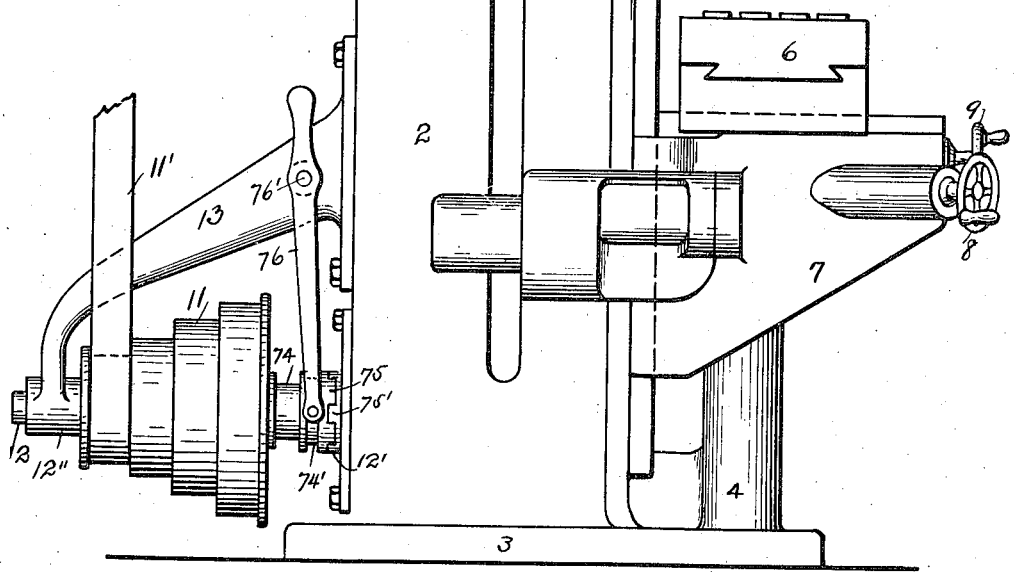
Figure 3:
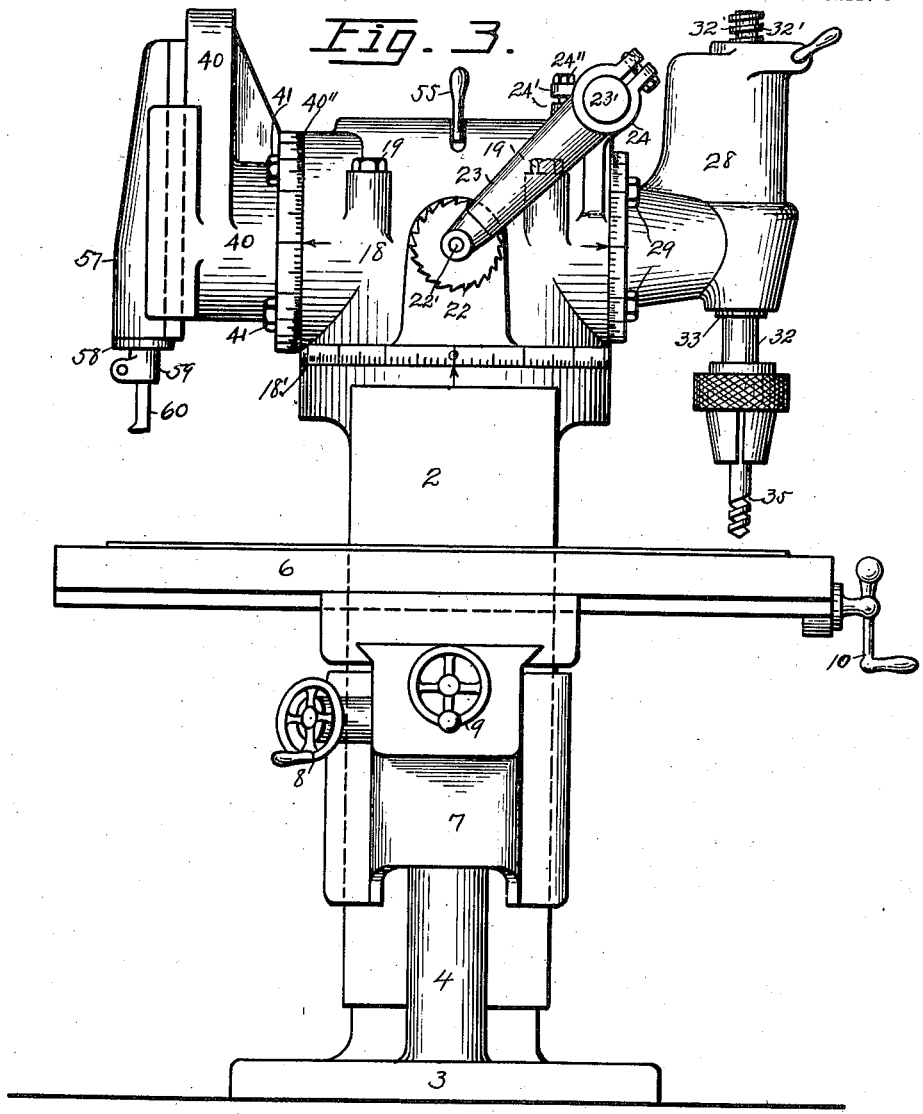
Figure 4:
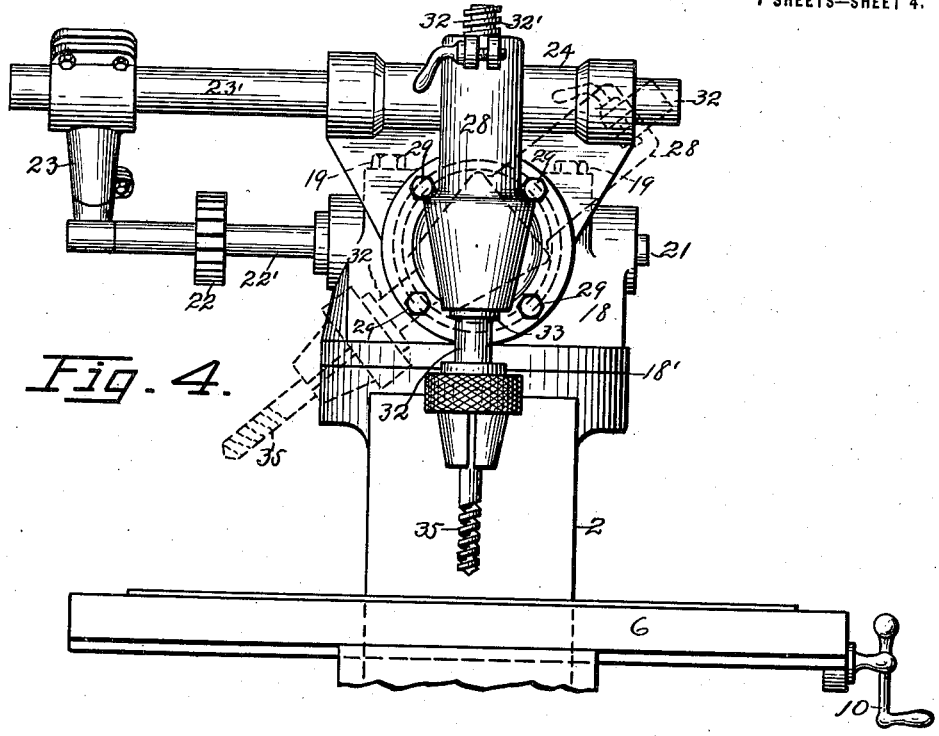
Figure 5:
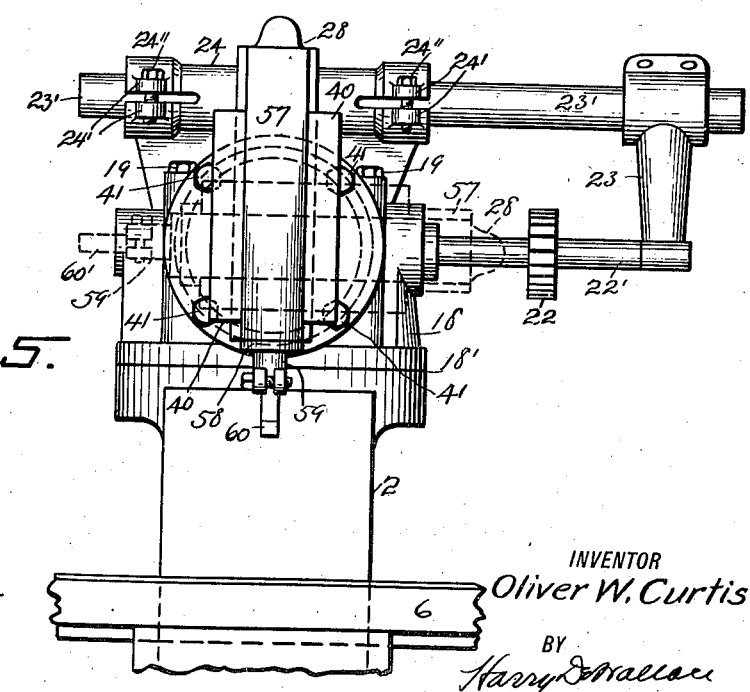
Figure 6:
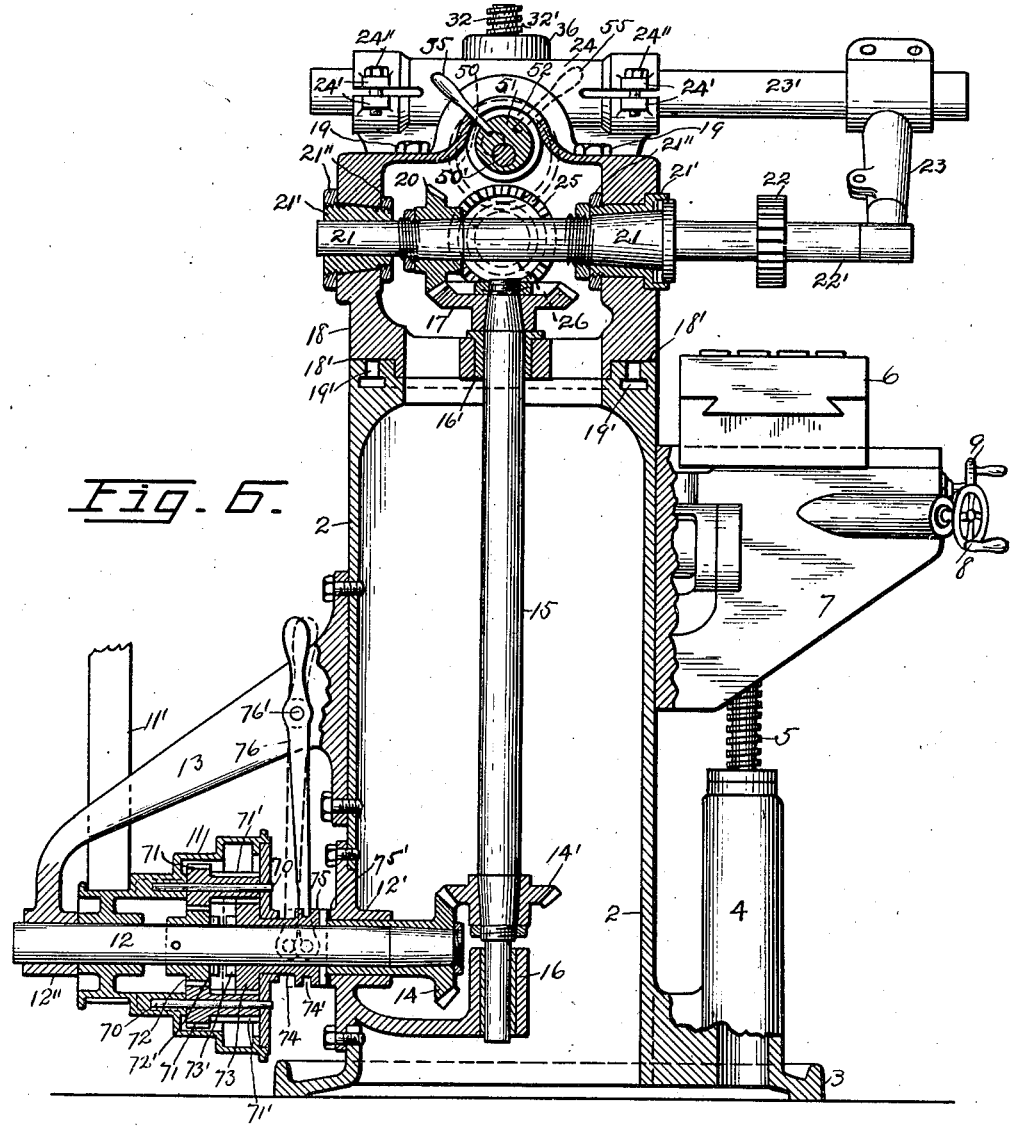
Figure 9:
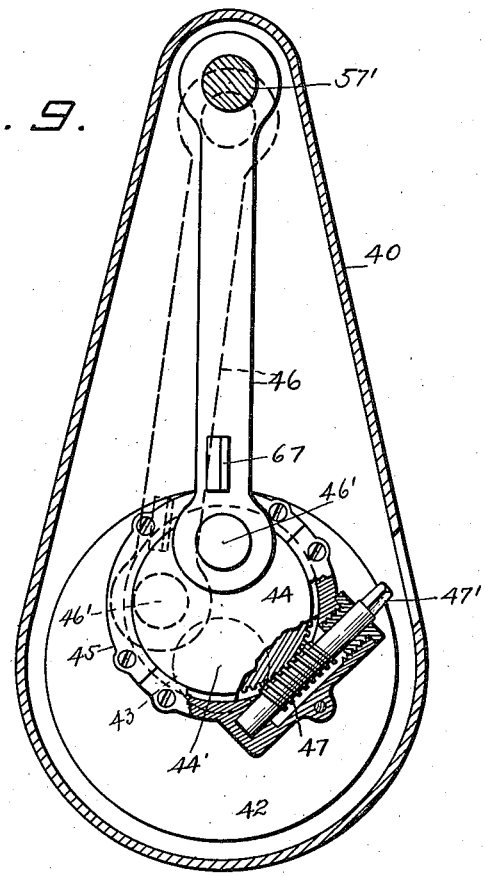
Figure 10:
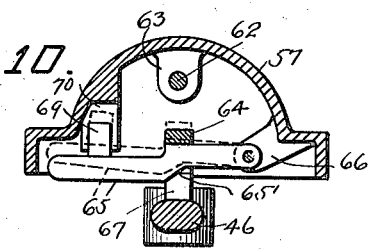

Figure 1 is a top plan view of the complete milling machine. Fig. 2 is a side elevation. Fig. 3 is a front side elevation. Fig. 4 is a partial front elevation of the machine; showing the drill mechanism disposed over the work table. Fig. 5 is a similar view; showing the slotting mechanism disposed over the work table. Fig. 6 is a central vertical section taken on line 6—6 of Fig. 1; showing the speed changing mechanism and the main driving parts which operate the various mechanisms carried by the turret. Fig. 7 is a transverse vertical section taken on line 7—7 of Fig. 1; showing the drill and slotting mechanisms. Fig. 8 is a horizontal section taken on line 8—8 of Fig. 7. Fig. 9 is a sectional view taken on line 9—9 of Fig. 7, and Fig. 10 is a sectional view taken on line 10—10 of Fig. 7.

In the drawing, 2 represents a stationary hollow column or body having a base 3, upon which is mounted a boss 4, which supports a screw 5. 6 represents an adjustable work supporting table, which is supported at one side of the body by a bracket 7, the latter operatively connected to the screw 5 and operated in a well known manner, as by hand wheel 8, for raising and lowering the table. The table 6 is movable toward and from the pedestal or column 2 by means of a hand-wheel 9, and said table is also movable longitudinally on the support 7 by means of a crank 10. At the opposite or rear side of the column 2 is positioned a belt-drive for the machine, consisting of a cone pulley 11 and a belt 11', the pulley being journaled on and geared to a shaft 12 having a bearing 12' in the column 2, and also a bearing 12'' in a bracket 13 supported by said column. The inner end of shaft 12 supports a bevel-gear 14 that drives a similar gear 14' which is rigid on the lower end-portion of an upright shaft 15, the latter shaft having its lower end journaled in a bearing 16, while a bearing 16' supports the upper end of said shaft. The upper end of shaft 15 is provided with a bevel-gear 17 which directly or indirectly drives the various tool mechanisms.

The top of column 2 is surmounted by a revoluble turret or cap, which carries a plurality of tool-mechanism, and consists of an irregular shaped hollow metal body 18, which is rotatable on the column 2 at the point or line indicated by the numeral 18'. The turret 18 is held concentric to the upright shaft 15 by means of a series of bolts 19, which pass downwardly through the cap, and whose heads are disposed in an annular T-slot 19', as best seen in Fig. 6. By this arrangement, the turret or cap 18 may be rotated freely horizontally upon an axis which corresponds to the center of the shaft 15, for bringing the various tools carried by the turret into various operative or working positions. The drive for the usual milling cutters carried by the turret (see Figs. 6 and 7) consists of a bevel-gear 20, which is constantly in mesh with and is driven by the gear 17. The gear 20 is rigid on a horizontal spindle or shaft 21, which extends through the body 18 and is journaled in bushings 21' disposed in suitable openings, the bushings being held in place by nuts 21''. By this arrangement the milling spindle 21 is rotated whenever shafts 12 and 15 are rotated. 22 represents one of many forms of milling cutters adapted to be connected to and operated by the spindle 21, the said cutter being mounted upon an arbor 22'. 23 represents a support for the arbor 22' consisting of an arm, which is movable on a rod 23', and the said rod is rotatable and slidable in a relatively long bearing 24 which is rigidly secured to the top of the cap 18. The ends of bearing 24 comprise clamping jaws 24' which are pierced by bolts 24''. The latter when tightened up serve to hold the rod 23' from movement when supporting one of the tools.

At right angles to the milling spindle 21 is arranged the drive for a drilling or boring attachment, which will now be described: 25 represents a bevel-gear which is also in constant mesh with the gear 17, and which is rigid on one end of a shaft or spindle 26 journaled in a sleeve-bearing 26'. Sleeve 26' is supported by a bushing 27 which is driven partway into the body 18 of the turret, while the remaining portion of said bushing supports a drill casing 28, and upon which the said casing may be rotated in a vertical plane, as at the joint or line 28'. The casing 28 is held in place and allowed rotary movement for drilling or boring in different directions, (see Fig. 4) by means of bolts 29, the heads of said bolts being inserted and movable in an annular T-slot 29' (see Fig. 7). The opposite end of shaft 26 is provided with an annular flange 25', which is perforated to receive clutch-pins 30 carried by a ring 30', the latter being movable on the sleeve 26' (see dotted lines Fig. 7). 31 represents a bevel-gear mounted on a shaft or spindle 31' having its bearing in a sleeve 32, which is inserted in a counterbore of the shaft 26. The gear 31 is provided with sockets corresponding to the perforations in the flange 25' to receive the ends of the clutch-pins 30, for driving gear 31 by the shaft 26. 32 represents a cylindrical drill shank or stock, which is slidable within a sleeve 33, and is rotatable with the said sleeve, by means of a key or feather 33'. The sleeve 33 is rotated by the gear 31, which meshes with a similar gear 34 rigid on said sleeve for imparting rotary motion to a drill, as 35. The upper end of the drill shank 32 is threaded, as at 32', and is surrounded by a cylindrical nut 36, which is suitably journaled in the top portion of casing 28. The nut 36 is driven by a pair of gears 37 and 37', the latter being rigid on said nut, for feeding the drill shank longitudinally during a drilling or boring operation. The gear 37 is mounted upon a shaft 38 which may be driven through a pair of bevel-gears 39—39' in the usual manner for drills of the class. A more particular description of the drill feeding and operating mechanism is not deemed important in the present case. The whole drill casing 28, as explained, is rotatable in a vertical plane on the sleeve 27 and the bearing 28', so that the said casing may be rotated and set in any desired position for drilling or boring vertically, horizontally, or at any suitable angle (see full and dotted lines in Fig. 4). By rotating the turret 18, the drill 35 may be positioned directly over the work table 6, and then the casing 28 may also be rotated and set, as described, for drilling at different angles relatively to the said table. The turret 18 may be rotated and set, as shown in Figs. 1 and 3, wherein the drill driving-shaft 26 is disposed parallel to the table 6, and then the drill may be adjusted to horizontal or other positions (the same as in Fig. 4), for drilling a piece of work mounted on the table, which projects laterally beyond the turret. By providing the swivel joint 28' and the clutch 30—31, the drill mechanism may be set for boring in any direction radially from the center of the shaft 26, and the said mechanism may be driven or stopped, at the will of the operator, by the manipulation of said clutch, and without disturbing the main driving mechanism or other parts.

Another important feature of my turret miller consists of a substantially universal slotting or shaping mechanism, which will now be described: 40 represents a hollow casing or body which is journaled on a bushing 40', a portion of said bushing being rigid in a suitable opening in the turret body 18. The casing 40 is held in operative engagement with the body 18 by bolts 41 whose heads are inserted and travel in an annular T-slot 41' when said casing is rotated. Within the casing 40 is disposed a crank-mechanism comprising a disk 42, which is rigid on a shaft or spindle 43 journaled in the bushing 40'. Upon the disk 42 is a smaller disk 44 which is held in place by, and is rotatable in a ring 45 secured to the disk 42, (see Figs. 7, 8 and 9). To the crank disk 44 is pivoted a rod 46, which is reciprocated by the rotary movement of said disks. The crank disk 44 is adjustable in the ring 45 for varying the stroke of the rod 46, by a worm 47, which engages corresponding teeth in the periphery of the disk 44 (see Fig. 9). The worm 47 may be operated by any suitable wrench or key, which may be applied to the square end 47', for adjusting the pivot center 46' toward or away from the center 44' of the crank disk (see dotted lines in Fig. 9). The crankshaft 43 is driven by the following means: 49 represents a spur-gear which is rigid on shaft 26 and meshes with a similar gear 50 mounted on one end of a shaft 50'. The shaft 50' is journaled eccentrically in a relatively long cylindrical bearing 51, which in turn is journaled in end bearings 52 carried by the turret body 18 (Fig. 7). Upon the opposite end of shaft 50' is mounted a spur-gear 53, which meshes with a similar gear 54 made rigid on the crank-shaft 43. The parts 50—50'—53 are what is commonly known as a "back gear," and the gears 50 and 53 may be moved into and out of engagement with the gears 49 and 54 by the rocking of the eccentric bearing 51, through the manipulation of a hand-lever 55, as shown in Fig. 1. By this provision the slotting mechanism may be set in motion or stopped at will without disturbing any of the other tool mechanisms carried by the main turret 18.

The slotting or shaping tool holder is movable with and to the extent of the variable stroke of the crank-rod 46, and comprises a hollow body 57, the upper end of which is pivoted to the crank-rod 46 by a pin 57' and a nut 57''. In the bottom end of the body 57 which is open, is inserted a bushing 58 which is rotatable, and within said bushing is disposed a tool-shank 59, which is preferably rectangular in cross-section (see Figs. 7 and 8). The shank 59 is secured to the bushing 58 by a pin 59' and is therefore movable with said bushing. The shank 59 is slightly narrower than the bushing, so that it may rock laterally sufficiently to allow the tool, as 60, to drag lightly over or clear the work on its return after performing a cutting stroke. By this provision, the edge of the tool, as well as the surface of the work are not dulled, or marred. In order to permit the shank 59 to rock, as described, the upper end of the shank is cut away to receive a wedge-shaped key 61 mounted on the lower end of a rod 62, which passes upwardly through a bracket 63 and also through one arm of a bell-crank 64, the upper end of the rod 62 being fitted with a nut 62' for holding it in place. The bell-crank 64 is pivoted within the body 57, and its other arm is in engagement with a transversely disposed lever 65, which is pivoted at one end to a lug 66, while the other end of said lever is free. The lever 65 is offset and has a beveled shoulder 65', which is disposed in the path of a lug or striker 67 carried by the crank-rod 46. At each stroke of the crank-rod 46 lengthwise, the said rod also sways back and forth laterally like a pendulum, so that on the return stroke, which corresponds to the return movement of the slotting tool 60, as the rod 46 passes the center, in one direction, the lug 67 strikes the shoulder 65' and swings the lever 65 in the direction for rocking the bell-crank 64, as from the full to the dotted line positions shown in Figs. 7 and 10. This lifts the wedge 61 sufficiently to allow the shank 59 and the tool 60 to yield away from the work, as described. As soon as the rod 46 moves away from the shoulder 65', a spring 68 forces the wedge 61 back into position for holding the shank 59 rigid during the subsequent cutting operation. The tool-holder 57 rotates with the casing 40, and these parts may be adjusted on the bearing 40'', and may be set in any desired position, as shown by the full and dotted lines in Fig. 5, for cutting vertical, horizontal, or angular slots, as dovetails, as well as for planing and shaping various surfaces of work positioned on the table 6.

The cone pulley constitutes a variable drive for the whole machine which in addition to the several belt sections of said pulley consists of the following parts: Within the larger end of the pulley 11 is journaled on shafts 70, at intervals, a number of pinions 71, which mesh constantly with a spur-gear 72 pinned to the shaft 12, the said gear having clutch-teeth 72' facing the column 2. The gears 71 have reduced gear or pinion portions 71' constantly in mesh with a spur-gear 73, which is journaled on the shaft 12, and has clutch-teeth 73' adapted to engage the teeth 72'. Integral with the gear 73 is a sleeve 74, which projects outside of the cone-pulley 11 and is provided with a groove 74', and also with clutch teeth 75, which are adapted to engage similar clutch teeth 75' disposed on the outer hub of the bearing 12'. 76 represents a lever pivoted at 76' to the bracket 13, the lower end of said lever engaging the groove 74', for sliding the gear 73 and sleeve 74 toward and away from the gear 72 and the bearing 12'. By reference to Fig. 6 it will be seen that, the sleeve 74 is in engagement with the bearing 12', so that the said gear and sleeve remain stationary and pinions 71' travel around said gear as a driver, for reducing the speed of gear 72 and accordingly the shaft 12 below that of the pulley 11. To again increase the speed of shaft 12 to the normal speed produced by the pulley 11, the lever 76 is swung to the dotted position shown in Fig. 6, which frees the clutch teeth 75—75' and engages the teeth 72'—73', so that the gear 73 and its sleeve 74 rotate with the gear 72 and the shaft 12. By the provision of the clutch mechanism just described, these several speeds of the pulley may be readily and quickly reduced, each in the same degree by locking the sleeve 74 to the bearing 12', as described. In this way the four step pulleys may operate the various tools carried by the turret 18 at eight different speeds.

My turret milling machine is extremely simple and by the novel construction and arrangement of the various tool operating mechanisms, the machine is rendered practically universal in its application to work that is mounted on the table 6, or in other locations within the reach of the several tools carried by the turret.

It is obvious that some changes or modifications may be made in the parts of the invention within the scope defined by the appended claims without departing from the spirit of the invention.

Having thus described my invention, what I claim as new and desire to secure by Letters Patent, is—

1. In a milling machine, the combination with an upright column, and a driving mechanism including a bevel-gear disposed in the top of said column, of a hollow turret pivoted to the top of said column concentric to said bevel-gear and rotatable in a horizontal plane, a spindle in said turret supporting a gear meshing with said bevel-gear, said spindle being hollow, a drill, and a pair of gears for driving said drill, one of said gears mounted on a shaft journaled in said spindle.

2. A milling machine including an upright body, a turret rotatable horizontally on said body, a spindle for operating a milling tool journaled in said turret, said spindle supporting a spur-gear, a slotting mechanism carried by said turret, a shaft for operating said slotting mechanism, a back-gear connecting said spur-gear with said shaft, a casing supporting a portion of said slotting mechanism, said casing pivoted to said turret and rotatable in a vertical plane, and a driving mechanism supported in said body adapted to drive said spindle and through said back-gear to drive said slotting mechanism.

3. A milling machine including an upright body, a turret-head rotatable horizontally on said body, a spindle for operating a milling tool journaled in said turret, a drilling mechanism carried by said turret, a spindle for driving said mechanism, said spindle positioned at right angles to the milling spindle, a casing for supporting said drilling mechanism pivoted to said turret and rotatable in a vertical plane, a driving mechanism supported in said body adapted to constantly drive one of said mechanisms, and a clutch adapted to operatively connect and disconnect said drilling mechanism.

4. In a milling machine, an upright body, a turret-head rotatable horizontally on said body, a spindle for operating a milling tool journaled in said turret, a boring mechanism carried by said turret, a casing for supporting said boring mechanism, said casing pivoted to said turret, and rotatable in a vertical plane, a slotting mechanism carried by said turret diametrically in line with said boring mechanism, a casing for supporting said slotting mechanism, said casing pivoted to said turret and rotatable in a vertical plane, a driving mechanism carried by said body adapted to constantly drive said milling spindle, and means for driving at will said boring and said slotting mechanisms.

5. In a milling machine, the combination with an upright column and a driving mechanism including a bevel-gear disposed in the top of said column, of a hollow turret pivoted to the top of said column concentric to said bevel-gear and rotatable in a horizontal plane, a spindle in said turret supporting a gear meshing with said bevel-gear, said spindle being hollow, a drill, a pair of gears for driving said drill, one of said gears mounted on a shaft journaled in said spindle, a shaft journaled in said turret in line with said spindle, a slotting tool, a holder for said tool, a crank carried by the said shaft adapted to reciprocate said tool and said holder, a back-gear, and spur-gears mounted on said spindle and said shaft adapted for operating said crank.

6. In a milling machine, the combination with the upright column and a variable speed driving mechanism including a bevel-gear, of a hollow turret rotatable on said column, a spindle in said turret supporting a gear in constant mesh with said bevel-gear, a shaft journaled in said turret in line with said spindle, a crank operatively connected to said shaft, a slotting tool, a casing for said tool reciprocated by said crank, a casing for said crank, said casing pivoted to said turret and rotatable in a vertical plane, and a back-gear operatively connecting said spindle with said shaft for driving said slotting tool.

7. In a milling machine, the combination with the upright column and a variable speed driving mechanism including a bevel-gear disposed at the top of said column, of a revoluble turret mounted upon said column, a spindle in said turret supporting a gear in constant mesh with said bevel-gear, a drill, a plurality of gears interposed between said spindle and said drill, a clutch for operatively connecting said gears with said spindle, a spur-gear carried by said spindle, a slotting mechanism including a tool, a crank for operating said tool, a shaft supporting said crank, a spur-gear for driving said shaft, and a back-gear interposed between said spur-gears.

8. In a milling machine, the combination with a hollow body, an adjustable work table, and a driving mechanism supported within said body, of a revoluble turret-head mounted on top of said body and rotatable in a horizontal plane, a milling spindle in said turret having a gear in constant mesh with a gear of said driving mechanism, a drill-operating spindle having a gear also in constant mesh with the gear of said driving mechanism, a drill, a casing for supporting said drill, said casing revoluble in a vertical plane, a gearing for driving said drill, and a clutch for operatively connecting said gearing with said drill operating spindle.

9. In a milling machine, the combination with a hollow column, an adjustable work table, and a variable speed driving mechanism supported in said column, of a hollow turret mounted upon the top end of said column and rotatable in a horizontal plane for bringing a number of tools carried by said turret in operative position relatively to said table, a hollow casing pivoted to said turret and rotatable in a vertical plane, a boring tool supported by said casing, a driving and feeding mechanism for said boring tool supported in said casing, and a clutch located within the turret and controlling the operation of said boring tool.

10. In a milling machine, the combination with the hollow pedestal and a driving mechanism supported therein, of a hollow turret rotatably mounted upon said pedestal, a milling spindle geared to the drive mechanism for constant operation, a drilling mechanism supported by said turret, a gearing for driving said drilling mechanism operated by said driving mechanism, a clutch for controlling said drilling mechanism, a casing inclosing said drilling mechanism, said casing swiveled to the turret and rotatable at right angles to said milling spindle, a slotting mechanism rotatably mounted on said turret and a gearing including a back-gear and a crank for operating said slotitng mechanism.

In testimony whereof I affix my signature.

OLIVER W. CURTIS.